(12) United States Patent
Cahill et al.

(10) Patent No.: US 8,837,610 B2
(45) Date of Patent: Sep. 16, 2014

(54) STABLE LOW POWER MODE FOR MULTICARRIER TRANSCEIVERS

(75) Inventors: Christopher Cahill, Northborough, MA (US); Richard Gross, Acton, MA (US); Marcos C. Tzannes, Orinda, CA (US)

(73) Assignee: TQ Delta, LLC, Austin, TX (US)

( * ) Notice: Subject to any disclaimer, the term of this patent is extended or adjusted under 35 U.S.C. 154(b) by 215 days.

(21) Appl. No.: 12/739,330

(22) PCT Filed: Nov. 21, 2008

(86) PCT No.: PCT/US2008/084322
§ 371 (c)(1),
(2), (4) Date: Aug. 12, 2010

(87) PCT Pub. No.: WO2009/067653
PCT Pub. Date: May 28, 2009

(65) Prior Publication Data
US 2010/0296555 A1 Nov. 25, 2010

Related U.S. Application Data

(60) Provisional application No. 60/989,542, filed on Nov. 21, 2007, provisional application No. 61/011,267, filed on Jan. 16, 2008.

(51) Int. Cl.
*H04K 1/10* (2006.01)
*H04L 27/28* (2006.01)
*H04L 27/26* (2006.01)

(52) U.S. Cl.
CPC .................................. *H04L 27/2601* (2013.01)
USPC ........... 375/260; 375/257; 375/258; 375/219; 375/220; 375/222; 370/463; 370/464; 370/465

(58) Field of Classification Search
CPC .............. H04L 27/2601; H04L 1/0025; H04L 25/0266; H04L 7/033; H04L 25/06; H04L 5/023; H04L 25/4927; H04L 5/1438; H04L 27/2608; H04L 27/10; H04L 27/2273; H04L 27/2071; H04L 25/0272; H04L 25/0292; H04L 25/028; H04L 25/08; H04L 7/0008; H04L 27/2647; H04L 5/0007; H04L 27/2657; H04L 27/2662; H04L 5/0048; H04L 29/06; H04L 49/90; H04L 1/0003; H04L 12/2801; H04L 47/10; H04L 29/06027; H04L 29/06163; H04B 1/40; H04B 3/23; H04B 1/403; H04B 2203/5445; H04B 3/54; H04B 3/542
USPC ......... 375/260, 257, 258, 219, 220, 222, 223; 370/463–465
See application file for complete search history.

(56) References Cited

U.S. PATENT DOCUMENTS 8,077,787 B2 * 12/2011 Okazaki ........................ 375/260
2005/0254515 A1 * 11/2005 Suzuki et al. ................. 370/463
2005/0271129 A1 12/2005 Reina

FOREIGN PATENT DOCUMENTS

CN 1972257 5/2007
CN 101022315 8/2007

(Continued)

OTHER PUBLICATIONS

Arthur Redfern Texas Instruments USA et al., "An Efficient L2 Mode for VDSL2," ITU-T Draft Study Period 2001-2004, International Telecommunication Union, Geneva; CH, Study Group 15—Delayed Contribution 1067, Apr. 19, 2004, pp. 1-9.

(Continued)

*Primary Examiner* — Phuong Phu
(74) *Attorney, Agent, or Firm* — Jason H. Vick; Sheridan Ross, PC (57) ABSTRACT

A stable Low Power Mode (LPM) for multicarrier transceivers is described that at least provides transmit power savings while enabling receiver designs that can easily operate without the detrimental effects of fluctuating crosstalk. In one exemplary embodiment, the LPM achieves power savings by reducing the number of used subcarriers without actually performing a power cutback on those subcarriers, thereby allowing a receiver to measure the SNR or noise levels and determine the crosstalk noise on the line regardless of a crosstalking modem being in a LPM or not.

36 Claims, 4 Drawing Sheets

(56) References Cited

FOREIGN PATENT DOCUMENTS

| EP | 1322101 | 6/2003 |
|----|---------|--------|
| EP | 1981191 | 10/2008 |
| JP | 2000-013298 | 1/2000 |
| JP | 2003-258765 | 9/2003 |
| JP | 2005-323301 | 11/2005 |
| JP | 2007-215207 | 8/2007 |
| WO | WO 00/54473 | 9/2000 |
| WO | WO 2007/088580 | 8/2007 |

OTHER PUBLICATIONS

ITU-T Very high speed digital subscriber line transceivers 2 (VDSL2) Recommendation G.993.2, Feb. 2006.
ITU-T Asymmetric digital subscriber line (ADSL) transceivers—Extended bandwidth ADSL2 (ADSL2plus) Recommendation G.992.5, May 2003.
ITU-T Asymmetric digital subscriber line transceivers 2 (ADSL2) Recommendation G.992.3, Jan. 2005.
International Search Report for International (PCT) Patent Application No. PCT/US2008/084322, mailed Jul. 1, 2009.
Written Opinion for International (PCT) Patent Application No. PCT/US2008/084322, mailed Jul. 1, 2009.
International Preliminary Report on Patentability for International (PCT) Patent Application No. PCT/US2008/084322, mailed Jun. 3, 2010.
Invitation to Pay Additional Fees and, Where Applicable, Protest Fee for International (PCT) Patent Application No. PCT/US2008/084322, mailed May 8, 2009.
Communication Pursuant to Rules 161(1) and 162 EPC for European Patent application No. 08852660.3, mailed Jul. 2, 2010.
First Official Action (including translation) for Chinese Patent Application No. 200880117277.5, issued Sep. 3, 2012.
First Official Action (including translation) for Japanese Patent Application No. 2010-535086, mailed Mar. 25, 2013.
Second Official Action (including translation) for Chinese Patent Application No. 200880117277.5, issued Jun. 4, 2013.
Official Action for European Patent application No. 08852660.3, mailed Jul. 4, 2013.
Third Official Action (including translation) for Chinese Patent Application No. 200880117277.5, issued Dec. 3, 2013.
Decision of Refusal for Japanese Patent Application No. 2010-535086, mailed Nov. 18, 2013.
Decision of Rejection (including translation) for Chinese Patent Application No. 200880117277.5, issued May 29, 2014.
Official Action for European Patent application No. 08852660.3, mailed May 13, 2014.

* cited by examiner

STABLE LOW POWER MODE FOR MULTICARRIER TRANSCEIVERS

RELATED APPLICATION DATA

This application is a national stage application under 35 U.S.C. 371 of International Application No. PCT/US2008/084322, having an international filing date of Nov. 21, 2008, which designated the United States, which PCT application claims the benefit of and priority under 35 U.S.C. §119(e) to U.S. patent application Ser. Nos. 60/989,542, filed Nov. 21, 2007, entitled "Stable Low Power Mode for Multicarrier Transceivers," and 61/011,267, filed Jan. 16, 2008, entitled "Stable Low Power Mode for Multicarrier Transceivers - Second Edition," each of which are incorporated herein by reference in their entirety.

BACKGROUND

Field of the Invention

This invention generally relates to communication systems. More specifically, an exemplary embodiment of this invention relates to power saving in a communications environment, and in particular an xDSL environment.

SUMMARY

Exemplary aspects of the invention relate to a stable Low Power Mode (LPM) for multicarrier transceivers that at least provides transmit power savings while enabling receiver designs that can easily operate without the detrimental effects of fluctuating crosstalk. In one exemplary embodiment, the LPM achieves power savings by reducing the number of used subcarriers without actually performing a power cutback on those subcarriers, thereby allowing a receiver to measure the SNR or noise levels and determine the crosstalk noise on the line regardless of a crosstalking modem being in a LPM or not.

One of the problems of low power modes is that the change in transmit power levels causes a change in the crosstalk into neighboring lines. This results in the non-stationary or fluctuating crosstalk that can cause bit errors and even retrains in other DSL connections in the binder.

The most common examples of problems due to the fluctuating crosstalk caused by LPMs are the following:

1. Performing initialization while a crosstalking transceiver is in a LPM. A transceiver that performs initialization when a crosstalking transceiver is in a LPM may allocate bits to subchannels that have a good SNR when the crosstalking transceiver is in the LPM, but will have very poor SNR when the crosstalking transceiver goes back into normal (full power) operation. Therefore when the crosstalking transceiver exits from the LPM the transceiver may experience many bit errors and even need to perform a retrain.

2. Performing On-Line reconfigurations (OLRs) (e.g., Bit Swaps, SRA, or the like) while a crosstalking transceiver is in a LPM. A transceiver that performs OLRs when a crosstalking transceiver is in the LPM may allocate bits to subchannels that have a good SNR when the crosstalking transceiver is in the LPM but will have very poor SNR when the crosstalking transceiver goes back into normal (full power) operation. Therefore when the crosstalking transceiver exits from the LPM, the transceiver may experience many bit errors and even need to perform a retrain.

In accordance with an exemplary embodiment, a LPM provides transmit power savings while enabling receiver designs that can operate without the detrimental effects of fluctuating crosstalk. The LPM achieves power savings by reducing the number of used subcarriers without actually performing a power cutback on those subcarriers thereby allowing a receiver to measure SNR or Noise levels and determine the crosstalk noise on the line regardless of a crosstalking modem being in LPM or not. A power cutback may also be performed on those subcarriers to achieve further power savings.

Aspects of the invention thus relate to power saving.

Still further aspects of the invention relate to power saving in a modem.

Additional aspects of the invention relate to power saving in an xDSL modem.

Still further aspects relate to power saving in a multicarrier transceiver.

Additional aspects relate to a multicarrier transceiver, capable of receiving a plurality of subcarriers, and a method of determining the Signal to Noise Ratio (SNR) on the plurality of subcarriers comprising measuring the SNR on a first subset of the plurality of subcarriers and using at least the measured SNR to estimate the SNR on a second subset of the plurality of subcarriers.

Still further aspects relate to a multicarrier transceiver, capable of receiving a plurality of subcarriers, and a method of determining the noise level on the plurality of subcarriers comprising measuring the noise level on a first subset of the plurality of subcarriers and using at least the measured noise to estimate a noise level on a second subset of the plurality of subcarriers.

Still further aspects relate to a multicarrier transceiver capable of receiving a plurality of subcarriers comprising a receiver portion capable of measuring a Signal to Noise Ratio (SNR) on a first subset of the plurality of subcarriers and capable of using at least the measured SNR to estimate the SNR on a second subset of the plurality of subcarriers.

Still further aspects relate to a multicarrier transceiver capable of receiving a plurality of subcarriers comprising a receiver portion capable of measuring a noise level on a first subset of the plurality of subcarriers and capable of using at least the measured noise to estimate a noise level on a second subset of the plurality of subcarriers.

Additional aspects of the invention relate to a multicarrier transceiver capable of receiving a plurality of subcarriers comprising means for measuring a Signal to Noise Ratio (SNR) on a first subset of the plurality of subcarriers and means for using at least the measured SNR to estimate the SNR on a second subset of the plurality of subcarriers.

Still further aspects relate to a multicarrier transceiver capable of receiving a plurality of subcarriers comprising means for measuring a noise level on a first subset of the plurality of subcarriers and means for using at least the measured noise to estimate a noise level on a second subset of the plurality of subcarriers.

Still further aspects of the invention relate to any of the above aspects wherein the first subset is defined as every Nth subcarrier in the plurality of subcarriers, where N is a positive integer.

Additional aspects of the invention relate to any of the above aspects wherein the measuring is performed during initialization.

Additional aspects of the invention relate to any of the above aspects wherein the measuring is performed during Showtime, e.g., user data transmission.

Still further aspects relate to a method of determining a first SNR on a first subcarrier in a multicarrier receiver comprising measuring or determining a second SNR on a second subcarrier and using at least the second SNR to determine the first SNR.

Additional aspects of the invention relate to a method of determining a first SNR on a first subcarrier in a multicarrier receiver comprising measuring or determining a noise level on a second subcarrier and using at least the noise level to determine the first SNR.

Still further aspects relate to means for determining a first SNR on a first subcarrier in a multicarrier receiver comprising measuring or determining a second SNR on a second subcarrier and means for using at least the second SNR to determine the first SNR.

Additional aspects of the invention relate to means for determining a first SNR on a first subcarrier in a multicarrier receiver comprising measuring or determining a noise level on a second subcarrier and means for using at least the noise level to determine the first SNR.

Additional aspects of the invention relate to a multicarrier transceiver capable of determining a first SNR on a first subcarrier in a multicarrier receiver and capable of measuring or determining a second SNR on a second subcarrier and capable of using at least the second SNR to determine the first SNR.

Still further aspects relate to a multicarrier transceiver capable of determining a first SNR on a first subcarrier in a multicarrier receiver and capable of measuring or determining a noise level on a second subcarrier and capable of using at least the second noise level to determine the first SNR.

Even further aspects of the invention relate to a multicarrier transceiver, capable of transmitting a plurality of subcarriers in a low power mode, the low power mode method comprising transmitting, during the low power mode, a subset of the subcarriers transmitted in a full power mode, wherein the subcarriers transmitted in the low power mode are transmitted at a power level that is the same as the power level transmitted in the full power mode.

Still further aspects relate to a multicarrier transceiver capable of transmitting a plurality of subcarriers comprising a transmitter portion capable of transmitting during a low power mode a subset of the subcarriers transmitted in a full power mode, wherein the subcarriers transmitted in the low power mode are transmitted at a power level that is the same as the power level transmitted in the full power mode.

Even further aspects of the invention relate to a multicarrier transceiver capable of transmitting a plurality of subcarriers comprising means for transmitting during the low power mode a subset of the subcarriers transmitted in a full power mode, wherein the subcarriers transmitted in the low power mode are transmitted at a power level that is the same as the power level transmitted in the full power mode.

Additional aspects of the invention relate to any of the above aspects wherein the subset is defined as every Nth subcarrier used in the full power mode, where N is a positive integer.

Even further aspects of the invention relate to a low power mode for use in multicarrier communications that achieves power savings by using a subset of the subcarriers transmitted in a full power mode wherein the subset of subcarriers transmitted in the low power mode are transmitted at the same power level as in the full power mode.

Additional aspects of the invention relate to a low power mode wherein the subset is defined as every Nth subcarrier used in the full power mode, where N is a positive integer.

Even further aspects of the invention relate to a method of configuring a low power mode comprising defining a subset of the subcarriers used during a full power mode for use in the low power mode wherein the subset is defined as every Nth subcarrier used in the full power mode, where N is a positive integer.

Additional aspects of the invention relate to the method of configuring a low power mode further comprising inputting the value of N into a management system that is used to configure DSL transceivers.

Still further aspects relate to the method of configuring a low power mode further comprising wherein the inputting is performed by a service provider.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to low power modes in an xDSL environment. However, it should be appreciated, that in general, the systems and methods of this invention will work equally well for any type of communication system, using any communication protocol in any environment.

The exemplary systems and methods of this invention will also be described in relation to multicarrier modems, such as xDSL modems and VDSL modems, and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a modem(s), or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system could be distributed between a modem and an associated computing device.

Furthermore, it should be appreciated that the various links, including the communications channel, connecting the elements (some not illustrated) can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Transmitting modem and Transmitting transceiver as well as Receiving modem and Receiving transceiver are used interchangeably herein. Additionally, the terms transceiver and modem have the same meaning and are used interchangeably. Also, the terms transmitter and transmitting modem have the same meaning and are used interchangeably as well as the receiver and receiving modem have the same meaning and are used interchangeably.

Moreover, while some of the exemplary embodiments described herein are directed toward a transmitter portion of a transceiver performing certain functionality, it should be appreciated that a corresponding complementary function is performed by a receiving portion of a transceiver. Thus, while perhaps not specifically illustrated in every example, this disclosure is intended to include this corresponding complementary functionality in both the same transceiver and/or another transceiver.

Figure 1:
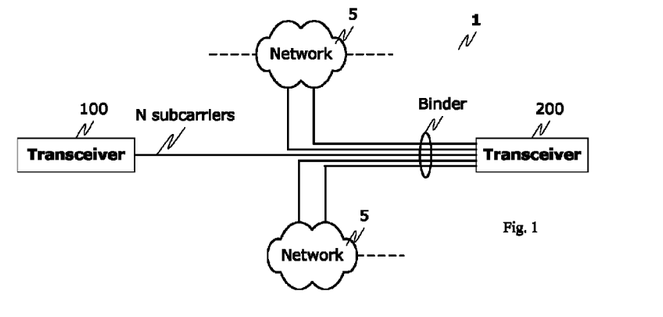
FIG. 1 illustrates an exemplary communications system according to this invention.

Communication system 1 comprises transceiver 100 and transceiver 200, interconnected by one or more links and one or more networks 5. The each transceiver 100 and 200, in addition to well known componentry, includes a transmitter portion and a receiver portion outlined in greater detail in FIG. 2. Specifically, transmitter portion 110 includes a subcarrier management module 120, controller/memory 130, subcarrier table 140 and bit loading module 150. The receiver portion 210 includes a SNR measurement module 220, a subcarrier management module 230, a SNR estimation module 240, a bit loading module 250, controller/memory 255, a noise measurement module 260, a noise estimation module 270, a power level measurement module 280, and subcarrier table 290. One or more of the transmitter portion 110 and receiver portion 210 can also be connectable to a management interface 300. The transmitter 110 and receiver 210 portions are connected via a link over which subcarriers 1-N are present.

As discussed above, the systems, methods, techniques and protocols discussed herein will be described in relation to xDSL systems, such as those specified in ADSL2 ITU-T G.992.3, ADSL2+ ITU G.992.5, and VDSL2 ITU G.993.2, which are all incorporated herein by reference in their entirety.

In operation, for one or more of the upstream (US) and downstream (DS) channels, the subcarriers to be used during the LPM are identified and messages indicating the same exchanged between the modems. In addition, messages with the bit allocations for one or more of the US and DS channels are exchanged. Then, during LPM, the transmitter reduces the transmit power by only using every Nth subcarrier for transmission. The power level of every subcarrier transmitted during the LPM will be the same as during a full power mode (i.e., no power cutback) thereby achieving a (1-1/N) percent transmit power savings. For example if N=10, and a transmitter transmits subcarriers 33-255 at −40 dBm/Hz during full power mode (FPM), the transmitter could transmit subcarriers 33, 43, 53, . . . , 233, 243, 253 at −40 dBm/Hz during the LPM. This would result in 1-1/10=90% reduction in transmit power.

Exemplary Receiver 210 Operation

Figure 2:
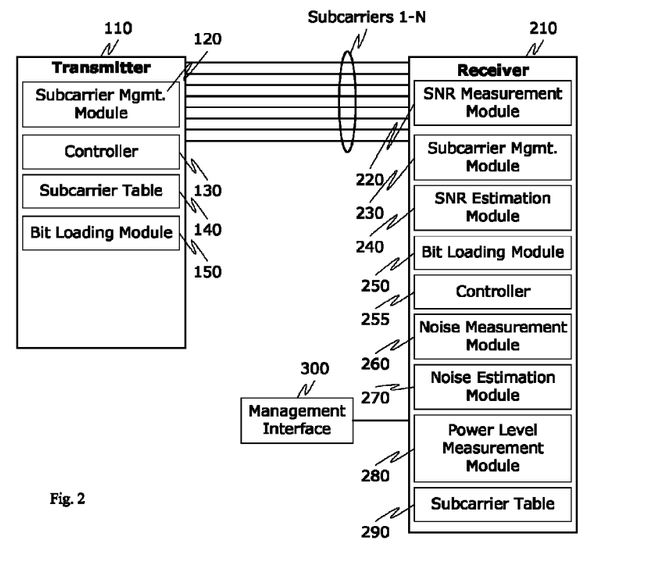
FIG. 2 illustrates an exemplary transmitter portion and receiver portion of respective modems according to this invention.

In accordance with one exemplary embodiment, in order to operate without the detrimental effects of the fluctuating crosstalk caused by the LPM of other transceivers in the binder, the receiver 210 would:

1. During Initialization and/or Showtime, the receiver 210, in cooperation with the SNR measurement module 220, would measure the SNR on those subcarriers that are specified for transmission during (as managed by the subcarrier management module 230) the LPM (regardless of a crosstalking transceiver being in LPM or not).

2. Based on at least these SNR measurements, the receiver 210, with the cooperation of the SNR estimation module 240, would estimate the SNR on the intermediate subcarriers that are not specified for transmission during the LPM. Since the distance between the measured subcarriers is relatively small, i.e., N*4.315 kHz, the receiver can use, for example, simple linear interpolation techniques to accurately estimate the SNR on the intermediate subcarriers. If there are other sources of noise (i.e., not from crosstalking transceivers), such as Radio Frequency Interference (RFI) or noise from other services in the binder, the estimation of the SNR by the SNR estimation module 240 on the intermediate carriers could also, for example, be based on other measurements such as measurements made on the intermediate subcarriers. For example, the SNR of the intermediate subcarriers could also be measured by the SNR measurement module 220 and this information could be incorporated into the estimation by the SNR estimation module 240 of the resulting SNR of the intermediate subcarriers when crosstalking transceivers are in LPM.

Additionally, other sources of noise (such as uncancelled echo and intersymbol or interchannel interference or the like) could also be used in the estimation of the SNR of the intermediate subcarriers by the SNR estimation module 240.

3. The receiver 210 uses the measured SNR on the LPM subcarriers and/or the estimated SNR on the intermediate subcarriers for bit loading algorithms run by the bit loading module 250 during initialization and/or Showtime OLRs.

Using the example above, if subcarriers 33, 43, 53, etc. were specified for transmission during the LPM, the receiver 210 would measure the SNR on these subcarriers via the SNR measurement module 220 and use this measured SNR to estimate the SNR via the SNR estimation module 240 on the intermediate subcarriers, i.e. 34-42, 44-52, etc. Since there is only 10*4.3125=43.125 kHz distance between the measured subcarriers, simple linear interpolation techniques (that could be performed by the controller/memory 255) would provide sufficient performance.

In general any form of interpolation could be used to estimate the SNR on the intermediate subcarriers. For example, a transceiver could use a linear interpolation method such that the SNR for intermediate subcarriers is estimated as a straight line connecting the SNR on the ith measured subcarrier and the SNR on the ith+N measured subcarrier. Alternately, for example, the known FEXT (far-end crosstalk) or NEXT (near-end crosstalk) coupling functions could be used for estimating the SNR between the measured subcarriers.

It is important to note that if the receiver 210 measures the SNR during Showtime and initialization on those subcarriers specified for transmission during the LPM, and uses those measurements to estimate the SNR on the other subcarriers, it does not matter which crosstalking transceivers are in LPM and which are not. This is the case because the power levels on the subcarriers specified for transmission during the LPM are constant in the low power and full power modes and therefore the SNR measured on those subcarriers is not dependent on the power mode of the other transceivers in the binder. Therefore, if receivers measure the SNR in this manner, all transceivers may enter and exit LPMs as quickly as possible without causing fluctuating crosstalk problems onto one another.

Therefore, in one embodiment, the LPM uses a subset of the subcarriers such that the crosstalk can still be estimated by another transceiver in the binder.

Numerical Example #1

Assume a multicarrier system operating with the following subcarrier indices: 20,21,22,23,24,25,26,27,28,29,30. Assume a LPM with N=10 and that the subcarriers transmitted in the LPM are the subcarriers with indices 20 and 30. Assume the SNR measurement on subcarrier 20 is 25 dB and on subcarrier 30 is 15 dB. If simple linear interpolation is used to estimate the SNR on the intermediate subcarriers, then the estimated SNR for the subcarriers 21,22,23,24,25,26,27,28 and 29 would be 24 dB, 23 dB, 22 dB, 21 dB, 20 dB, 19 dB, 18 dB, 17 dB and 16 dB, respectively.

Numerical Example #2

Assume a multicarrier system operating with the following subcarrier indices: 20,21,22,23,24,25,26,27,28,29,30. Assume a LPM with N=10 and that the subcarriers transmitted in the LPM are the subcarriers with indices 20 and 30. Assume the SNR measurement on subcarrier 20 is 25 dB and on subcarrier 30 is 15 dB. Also assume that there is a narrow band RFI that is impacting subcarrier number 25 and that the measured SNR on this subcarrier is 20 dB. For all the other intermediate subcarriers that are not impacted by the RFI, if simple linear interpolation is used, the estimated SNR for the subcarriers 21,22,23,24,26,27,28 and 29 would be 24 dB, 23 dB, 22 dB, 21 dB, 19 dB, 18 dB, 17 dB and 16 dB, respectively. The SNR on subcarrier number 25 can be estimated as a result of the combination of the RFI noise and the DSL crosstalk. As an example, if the estimated SNR due to DSL crosstalk is 20 dB (as calculated in the Numerical Example 1 above) and the SNR due to the RFI is 20 dB, a linear combination of the two SNRs would result in a resulting total estimated SNR of 17 dB for sub channel 20.

Measuring the Noise Level instead of the Signal to Noise Ratio (SNR)

Alternatively, or in addition, to measuring the SNR by the SNR measurement module 220, the receiver 210 could measure the noise level in cooperation with the noise measurement module 260 on the subcarriers that are specified for transmission during the LPM by the subcarrier management module 230.

For example, in order to operate without the detrimental effects of the fluctuating crosstalk caused by the LPM of other transceivers in the binder, the receiver 210 would:

1. During initialization and/or Showtime, the receiver 210 in cooperation with the noise measurement module 260 would measure the noise level on those subcarriers that are specified for transmission during the LPM (regardless of a crosstalking transceiver being in LPM or not). Additionally, the receiver 210 in cooperation with the SNR measurement module 220 would measure the SNR on those subcarriers that are specified for transmission during the LPM (regardless of a crosstalking transceiver being in LPM or not).

2. Based on at least these noise measurements, the receiver 210 in cooperation with the noise estimation module 280 would estimate the noise level (Ni) on the intermediate subcarriers that are not specified for transmission during the LPM. Since the distance between the measured subcarriers is relatively small, i.e., N*4.315 kHz, the receiver can use, for example, simple linear interpolation techniques to accurately estimate the noise level on the intermediate subcarriers. If there are other sources of noise (i.e., not from crosstalking transceivers), such as Radio Frequency interference (RFI) or noise from other services in the binder, the estimation of the noise on the intermediate carriers could also, for example, be based on other measurements such as measurements made on the intermediate subcarriers.

For example, the noise of the intermediate subcarriers could also be measured and this information could be incorporated into the estimation of the resulting noise of the intermediate subcarriers when crosstalking transceivers are in a LPM. Additionally, other sources of noise (such as uncancelled echo and intersymbol or interchannel interference or the like) could also be used in the estimation of the noise of the intermediate subcarriers.

3. During Initialization and/or Showtime, the receiver 210 in cooperation with the power level measurement module 280 measures the received signal power level (Pi) on the intermediate subcarriers (i.e., those that are not specified for transmission during the LPM).

4. The receiver 210 then estimates with the cooperation of the SNR estimation module 240 the SNR on the intermediate subcarriers using the measured received signal power level (from step 3) and the estimated noise level (from step 2). For example, the receiver 210 could estimate the SNR by taking the ratio Pi/Ni for each subcarrier.

5. The receiver 210 next uses the SNR on the LPM subcarriers and/or the estimated SNR on the intermediate subcarriers for bit loading algorithms during Initialization and Showtime OLRs.

Using the example above, if subcarriers 33, 43, 53, etc. were specified for transmission during the LPM, the receiver 210 would measure the noise level on these subcarriers and use this measured noise to estimate the noise on the intermediate subcarriers, i.e., 34-42, 44-52, etc. Since there is only 10*4.3125=43.125 kHz distance between the measured subcarriers, simple linear interpolation techniques would provide sufficient performance. In general any form of interpolation could be used to estimate the noise level on the intermediate subcarriers. For example, a transceiver could use a linear interpolation method such that the noise level for intermediate subcarriers is estimated as a straight line connecting the noise level on the ith measured subcarrier and the noise level on the ith+N measured subcarrier.

Alternatively, for example, the known FEXT or NEXT coupling functions could be used for estimating the noise level between the measured subcarriers. The receiver 210 would then estimate the SNR on subcarriers 34-42. 44-52, etc, using the estimated noise level and the measured signal power levels for these subcarriers.

It is important to note that if the receiver 210 measures the noise level during Showtime and Initialization on those subcarriers specified for transmission during the LPM and uses those measurements (along with the measured received signal power levels) to estimate the noise levels on the other subcarriers, it does not matter which crosstalking transceivers are in LPM and which are not. This is the case because the power levels on the subcarriers specified for transmission during the LPM are constant in the low power and full power modes and therefore the noise levels measured on those subcarriers is not dependent on the power mode of the other transceivers in the binder. Therefore, if receivers measure the noise levels in this manner, all transceivers may enter and exit LPMs as quickly as possible without causing fluctuating crosstalk problems onto one another.

Therefore, in one embodiment, the LPM uses a subset of the subcarriers such that the crosstalk can still be estimated by another transceiver in the binder.

Numerical Example #3

Assume a multicarrier system operating with the following subcarrier indices: 20,21,22,23,24,25,26,27,28,29,30. Assume a LPM with N=10 and that the subcarriers transmitted in the LPM are the subcarriers with indices 20 and 30. Assume the noise level measurement on subcarrier 20 is −55 dBm/Hz dB and on subcarrier 30 is −65 dBm/Hz dB. Assume the received signal power level is flat at −80 dBm/Hz. For example, if simple linear interpolation is used to estimate the noise on the intermediate subcarriers, then the estimated noise for the subcarriers 21,22,23,24,25,26,27,28 and 29 would be −56 dBm/Hz, −57 dBm/Hz, −58 dBm/Hz, −59 dBm/Hz, −60 dBm/Hz, −61 dBm/Hz, −62 dBm/Hz, −63 dBm/Hz, −64 dBm/Hz, respectively. Using this noise estimation, based on received signal power level of −80 dBm/Hz, the estimated SNR for the subcarriers 21,22,23,24,46, 26,27,28 and 29 would be 24 dB, 23 dB, 22 dB, 21 dB, 20 dB, 19 dB, 18 dB, 17 dB and 16 dB, respectively.

Numerical Example #4

Assume a multicarrier system operating with the following subcarrier indices: 20,21,22,23,24,25,26,27,28,29,30. Assume a LPM with N=10 and that the subcarriers transmitted in the LPM are the subcarriers with indices 20 and 30. Assume the noise level measurement on subcarrier 20 is −55 dBm/Hz dB and on subcarrier 30 is −65 dBm/Hz dB. Assume the received signal power level is flat at −80 dBm/Hz. Also assume that the there is a narrow band RFI that is impacting subcarrier number 25 and that the measured noise on this subcarrier is −60 dBm/Hz. For all the other intermediate subcarriers that are not impacted by the RFI, if simple linear interpolation. For example, if simple linear interpolation is used to estimate the noise on the intermediate subcarriers, the estimated noise for the subcarriers 21,22,23,24,26,27,28 and 29 would be −56 dBm/Hz, −57 dBm/Hz, −58 dBm/Hz, −59 dBm/Hz, −61 dBm/Hz, −62 dBm/Hz, −63 dBm/Hz, −64 dBm/Hz, respectively. Using this noise estimation, based on received signal power level of −80 dBm/Hz, the estimated SNR for subcarriers 21,22,23,24,26,27,28 and 29 would be 24 dB, 23 dB, 22 dB, 21 dB, 19 dB, 18 dB, 17 dB and 16 dB, respectively. The noise on subcarrier number 25 can be estimated as a result of the combination of the RFI noise and the DSL crosstalk. As an example, if the estimated noise due to DSL crosstalk is −60 dBm/Hz (as calculated in the Numerical Example 3 above) and the noise due to the RFI is −60 dBm/Hz, a linear combination of the two noises would result in a resulting total estimated noise of −63 dBmHz for sub channel 20. The resulting SNR, based on a received signal power of −80 dBm/Hz, would be for example, 17 dB.

Subsets of subcarriers used during the LPM

In the examples above the subset of subcarriers used during the LPM was defined as every Nth subcarrier transmitted during the full power mode. In general any definition for a subset of subcarriers can be used.

For example, instead of only 1 subcarrier being transmitted every N subcarriers, a number L (L>1) subcarriers could be transmitted every Nth subcarrier. For example, if L=3, and N=30, and there is a total number of M=90, indexed from 10 to 89 subcarriers, the following subcarriers could be transmitted: 10, 11, 12, 40, 41, 42, 70, 71, 72. This results in reducing the number of subcarriers from 90 to 9, i.e., a factor of 10 in power reduction. As in the example above, the other transceivers in the binder would determine the crosstalk by measuring the SNR on the known subcarrier numbers (e.g. 10, 11, 12, 40, 41, 42, etc) and extrapolating the SNR for the intermediate subcarriers (e.g. 13-39, 43-69, etc). For example, the other transceivers could use a linear interpolation method to estimate the SNR on intermediate subcarriers. In general any form of interpolation could be used to estimate the SNR on the intermediate subcarriers. For example, the known FEXT or NEXT coupling functions could be used for estimating the SNR on the intermediate subcarriers.

In general any algorithmic method for defining a subset of values from an array of subcarrier indexes could be used to define the subset of subcarriers used during the LPM.

Alternatively, or in addition, the subset of subcarriers to be used during the LPM could be defined as a list of subcarriers indexes. For example, if there are a total of M=90 subcarriers, indexed from 10 to 89, the list can take on any values such as [13, 21, 34, 54, 60, 78, 88].

In an alternate embodiment, the subcarriers used during the LPM are not fixed but vary over time. This exemplary embodiment is called the Subcarrier Sweeping LPM. In this embodiment, a first subset of subcarriers is used for a first period of time during the LPM, a second subset of subcarriers is used during a second period of time, etc. For example, if there are 100 subcarriers during the LPM, indexed from 1 to 100, subcarriers 1-10 could be used for a first period of time (e.g., 1 second or 1000 DMT symbols), subcarriers 11-21 could be used for a second period of time (e.g., 1 second or 1000 DMT symbols), and so on. It follows that after a ten periods of time, all 100 subcarrier would have been sent during the LPM. One of the main benefits of this method is that a receiver that measures SNR or noise levels during the 10 time periods can determine the SNR for all subcarriers without requiring estimation or interpolation techniques for the intermediate subcarriers (as described above).

Defining the Subset of Subcarriers for the LPM

The subset of the subcarriers used during the LPM could be defined by any of the following entities:

Service provider (this has the benefit that the service provider can define the subset based on Bandplans, binder management issues, regulatory issues, etc)

The end user/consumer

The CO modem (e.g., VTU-O or ATU-C) for upstream and/or downstream transmission

The CPE modem (e.g., VTU-R or ATU-R) for upstream and/or downstream transmission The CPE receiver for downstream transmission The CO receiver for upstream transmission If defined by the service provider or the end-user, the subset of subcarriers could be inputted into the system through, for example, management interface 300. For example, the service provider could input the index values for the subset of subcarriers by defining the values of N above. For example, the service provider could specify via a management interface that starting from subcarrier number 33 every Nth=12 subcarrier shall be used for transmission during the LPM. Alternatively, for example, the service provider could specify via a management interface that starting from subcarrier number 33 up to subcarrier 512 every Nth=12 subcarrier shall be used for transmission during the LPM and that starting from subcarrier number 600 up to subcarrier 900 every Nth=6 subcarriers shall be used for transmission during the LPM. Alternatively, for example, the service provider could specify via the management interface 300 more than 1 subcarrier to be transmitted every N subcarriers, as described in examples above. Alternatively, or in addition, the service provider could specify a list of subcarriers to be used during LPM, where, for example, this list can take on any values such as [45, 59, 88, 123, 129, etc].

In the case of the Subcarrier Sweeping LPM, the service provider could define the sweep time, i.e., the period of time during the LPM for which a subset of subcarriers should be transmitted. For example, the service provider could specify that S=10 subcarriers should be transmitted in the LPM and the sweep time should be 100 ms. Under this exemplary configuration, in the LPM, the first 10 subcarriers from the FPM would be sent for 100 ms, then the next 10 subcarriers would sent for the next 100 ms, etc.

A transceiver (such as the VTU-O, VTU-R, ATU-C or ATU-R) could also define the subset of subcarriers in a similar manner as described in the examples for the service provider above.

Sending and Receiving Messages on the LPM Parameters

When the service provider or the CO modem defines the subset of subcarriers to be used during the LPM, the information could be sent from the CO modem (e.g. ATU-C or VTU-O) to the CPE (e.g. RT modem or ATU-R or VTU-R) as outlined later in relation to FIG. 5. The information contained in the message could be stored in the subcarrier table 290 under the direction of the subcarrier management module 230 and would indicate which subcarriers are to be used during the LPM. For example, the message could contain a list of subcarrier indexes such as, for example, [78, 129, 343, 355, etc]. Alternatively, for example, the message could contain at least one value for N (as described in the examples above). For example, if N=10 during the LPM, every 10th subcarrier would be transmitted. Alternatively, for example, the message could contain at least one value for N (as described in the examples above) and at least one starting subcarrier index for the indexing. For example, N=10 and the starting frequency index could be set to 33 which indicates that during the LPM subcarriers with indexes 33, 43, 53, . . . should be used. Alternatively, for example, the message could contain at least one value for N (as described in the examples above) and at least one starting subcarrier index and at least one ending subcarrier index. For example, N=10 and the starting frequency index could be set to 33 and the ending subcarrier index could be set to 100 which indicates that during the LPM subcarriers with indexes 33, 43, 53, . . . , 83, 93 should be used. In general any algorithmic method for defining a subset of values from an array of subcarrier indexes could be used to define the subset of subcarriers sent in the message.

When the CPE modem or the end user defines subset of subcarriers to be used during the LPM, the information could be sent from the CPE modem to the CO. The information contained in the message would indicate which subcarriers are to be used during the LPM. For example, the message could contain a list of subcarrier indexes such as, for example, [78, 129, 343, 355, etc]. Alternatively, for example the message could contain at least one value for N (as described in the examples above). For example, if N=10 during the LPM every 10th subcarrier would be transmitted. Alternatively, for example the message could contain at least one value for N (as described in the examples above) and at least one starting subcarrier index for the indexing. For example, N=10 and the starting frequency index could be set to 33 which indicates that during the LPM subcarriers with indexes 33, 43, 53, . . . should be used. Alternatively, for example the message could contain at least one value for N (as described in the examples above) and at least one starting subcarrier index and at least one ending subcarrier index. For example, N=10 and the starting frequency index could be set to 33 and the ending subcarrier index could be set to 100 which indicates that during the LPM subcarriers with indexes 33, 43, 53, . . . , 83, 93 should be used. In general any algorithmic method for defining a subset of values from an array of subcarrier indexes could be used to define the subset of subcarriers sent in the message.

Additionally in the case of the Subcarrier Sweeping LPM, the sweep time would need to be exchanged in a message. The sweep time could be, for example, defined in seconds, DMT symbols or the like.

These messages could be sent during initialization and/or during Showtime. If a transceiver needs this information for measuring SNR or noise levels during initialization then the messages need to be sent before the receiving modems measure SNR or noise levels during initialization. In this case the message could be sent during G.hs or the Channel Discovery phase of initialization.

Additionally, the subcarriers used during the LPM may be updated or modified in Showtime or initialization. For example, a first message could be sent defining a first subset of subcarriers to be used in the LPM and subsequently a second message could be sent defining a second subset of subcarriers used in the LPM. For example, the first message could define the first subset by a starting index 33 and a value N=10 indicating that every 10th carrier should be transmitted in the LPM starting from subcarrier number 33. And the second message could define the second subset by a starting index 34 and a value N=11 indicating that every 11th carrier should be transmitted in the LPM starting from subcarrier number 34.

Defining the Bit Allocation Values for the Subset of Subcarriers in the LPM

The bit allocation value (i.e., the number of bits transmitted on a subcarrier) of each subcarrier during the LPM could be defined by the receiving modem, the transmitting modem, the CO modem for both US and DS, the CPE modem for both US and DS, the service provider or the end-user.

In one embodiment, the bit allocation values are determined by the receiving modem. Therefore the CPE modem would determine the bit allocation values for the DS direction and/or the CO modem would determine the bit allocation values for the US direction. In one embodiment, the receiver could use the same bit allocation values as those that were used during the FPM operation. In this case it is not necessary for the receiving modem to transmit the bit allocation values to the transmitting modem because they would be the same as those used for FPM operation. Alternatively, the receiving modem could define new bit allocation of values for the subcarriers used during the LPM. In this case, the new bit allocation values would be communicated to the transmitting modem in a message. Alternatively, the bit allocation values could be defined as a predefined or negotiated reduction in the number of bits used during the FPM. For example, there could be a bit reduction of B=2, so that a subcarrier with B=8 bits during the FPM would use B=6 bits during the LPM. In this case it is not necessary for the receiving modem to transmit the bit allocation values to the transmitting modem because they would be computed from those used for FPM operation. However, the value of B may be communicated in a message, if B was determined by the receiving modem.

In an alternate embodiment, the bit allocation values are determined by the transmitting modem. Therefore the CPE modem would determine the bit allocation values for the US direction and/or the CO modem would determine the bit allocation values for the DS direction. In this case, for example, the transmitter could use the same bit allocation values as those that were used during the FPM operation. In this case, it is not necessary for the transmitting modem to transmit the bit allocation values to the receiving modem because they would be the same as those used for FPM operation. Alternatively, the transmitting modem could define new bit allocation of values for the subcarriers used during the LPM. In this case the new bit allocation values would be communicated to the receiving modem in a message. Alternatively, the bit allocation values could be defined as a predefined or negotiated reduction the number of bits used during the FPM. For example, there could be a bit reduction of B=2, so that a subcarrier with B=8 bits during the FPM would use B=6 bits during the LPM. In this case it is not necessary for the transmitting modem to transmit the bit allocation values to the receiving modem because they would be computed from those used for FPM operation. However, the value of B may be communicated in a message, if B was determined by the transmitting modem.

In an alternate embodiment, the bit allocation values are determined by the service provider. While it does not make practical sense for the service provider to define the bit allocation values directly, the service provider could indirectly define the bit allocation values by configuring LPM bit allocation values via configurable reduction in bit allocation values from the FPM operation. For example, the service provider could configure the value for B as described above. Additionally the service provider could configure via a management interface the minimum required data rate for the LPM.

In some cases, the bit allocation values of a subcarrier during low power mode may be zero, i.e., no bits are transmitted on that subcarrier. This could occur, for example, if the bit reduction value B is set to 2 and a subcarrier has bit allocation value of 2 during Showtime. In this case, the bit allocation value of this particular subcarrier would be set 0 during the LPM. Under these conditions, a non-data carrying PRBS value could be assigned to this subcarrier in order to transmit a signal on this subcarrier. Alternatively, this subcarrier could not be transmitted in the LPM. Alternatively, this subcarrier may not be decreased by the bit reduction value B, but rather still use a bit allocation value of 2 during the LPM.

Exemplary Method of a LPM

This is an exemplary method of the LPM configuration and system operation. In this example, the service provider configures the subcarriers to be used during the LPM and the receiving modem determines the bit allocation values during the low power mode.

In this exemplary method of the LPM, a service provider is configuring an ADSL2+ service to use the LPM described in this invention. The ADSL2+ service uses subcarriers 6-32 for upstream (US) transmission and subcarriers 33-511 for downstream (DS) transmission. The service provider could configure, via the management interface (e.g. a MIB), that, for example, every N=10th subcarrier should be used for the LPM in both the US and DS direction (in this example US and DS use the same value for N, but they could be different). Under this configuration, the following subcarrier numbers could be used for the US LPM: 6, 16, 26. Additionally, the last subcarrier 32 could be assigned to the LPM in order to get a measurement for all possibly used US subcarriers. Likewise, the following subcarrier numbers could be used for the DS LPM: 33, 43, 53, . . . , 493, 503. Additionally, the last subcarrier 511 could be assigned to the LPM in order to get a measurement for all possibly used DS subcarriers. Alternatively, the service provider could configure, via a management interface (e.g., a MIB), that, for example, every N=10th subcarrier should be used for the LPM in both the US and DS direction and that the starting subcarrier for indexing for both US and DS should, for example, be subcarrier #10.

In this configuration, US subcarriers 10, 20 and 30 would be used for the US LPM and DS subcarriers 40, 50, 60, . . . , 490, 500, 510 would be used for the DS LPM. Alternatively, the service provider could configure the LPM subcarriers using a programmable list of subcarriers such as, for example, [6, 13, 18, 24, 32] for US and [33, 53, 74, 95, 120, 150, 220,283, 332, 442, 510] for DS.

After configuring the subcarriers to be used during the LPM, the CO transceiver would send a message (during initialization and/or Showtime) to the CPE transceiver indicating which DS subcarriers are to be used in the LPM. This message could, for example, contain information that indicates the LPM subcarriers with a list, and/or with a value N, and/or with a value N including a starting and or ending subcarrier (as described in the examples above).

The CPE receiver would receive the message sent by the CO transceiver and send a message back to the CO transceiver indicating the bit allocation values of the DS LPM subcarriers. Therefore when entering the LPM the CO transmitter would transmit using the bit allocation values communicated in the message from the CPE transceiver.

Likewise, for the US direction, the CO transceiver would send a message (during initialization and/or Showtime) to the CPE transceiver indicating the bit allocation values of the US LPM subcarriers. Therefore when entering the LPM the CPE transmitter would transmit using the bit allocation values communicated in the message from the CO transceiver.

When measuring the SNR and/or noise levels during initialization and/or Showtime the receiving modems would first measure the SNR and/or noise levels on the LPM subcarriers and then uses this information to determine/estimate the SNR or noise levels on the intermediate subcarriers. Therefore, for example, if the service provider configured US subcarriers 6, 16, 26, 32 for the US LPM, the CO receiver would measure the SNR and/or noise levels on subcarriers 6,16,26,32 and use this information to determine the SNR and/or noise levels on the intermediate subcarriers 7-15, 17-26, 27-31. Likewise the CPE receiver would do the same for DS LPM subcarriers defined by the service provider.

Determining the presence of crosstalking modems in LPM.

A receiver can determine if other crosstalking modems are in LPM by measuring the SNR on all the subcarriers used during FPM and detecting if there is an increase in the noise level (and/or decrease SNR) on the subcarriers that are used for LPM by the crosstalking modems. For example, if subcarriers 10, 20, 30 were used during the LPM, the receiver would measure the SNR subcarrier 10-30 and if there was a significant increase in the SNR on subcarriers 10,20 and 30 compared to 11-19 and 21-29, then the receiver would know that there are crosstalking modems in LPM. In this case the receiver would estimate the SNR and/or noise levels on the intermediate subcarriers (i.e., 11-19 and 21-29) use the measurements on subcarriers 10, 20 and 30. If, on the other hand, the SNR was not higher on the LPM subcarriers 10, 20 and 30, the receiving modem would know that there are no other crosstalking modems in LPM and the SNR and/or noise levels of the all the subcarriers, including the intermediate subcarriers (i.e. 11-19 and 21-29) could be measured directly. This way, the receiving modem will know that it will not suffer from fluctuating crosstalk when crosstalking modems enter and/or exit LPM.

Therefore this LPM is detectable by a receiving modem and thereby enables a receiving modem to measure the SNR and/or noise levels to determine bit allocation tables that will be stable and operate without errors in the presence of the fluctuating crosstalk caused by crosstalking modems entering and/or exiting LPM.

The LPM does not require time constraints for reducing fluctuating crosstalk

Traditional LPMs cause fluctuating (non-stationary) crosstalk that disrupts the operation of other DSL connections in the binder. For this reason, traditional LPM require time constraints that limit how quickly a transceiver can enter into a LPM from a FPM in order to reduce the number of times during a day in which a LPM to FPM transition occurs.

One of the exemplary benefits of the LPM according to this invention, is that it does not require time constraints for entry and exit into LPM because the LPM provides a method of measuring the SNR and/or noise levels that is not dependent on power mode status of the crosstalking transceivers in the binder. Additionally, a receiving modem can detect if other transceivers are in LPM as described above.

Therefore, for example, this LPM allows modems to enter and exit LPM without time constraints that are imposed to reduce the amount of fluctuating crosstalk in the system.

Figure 3:
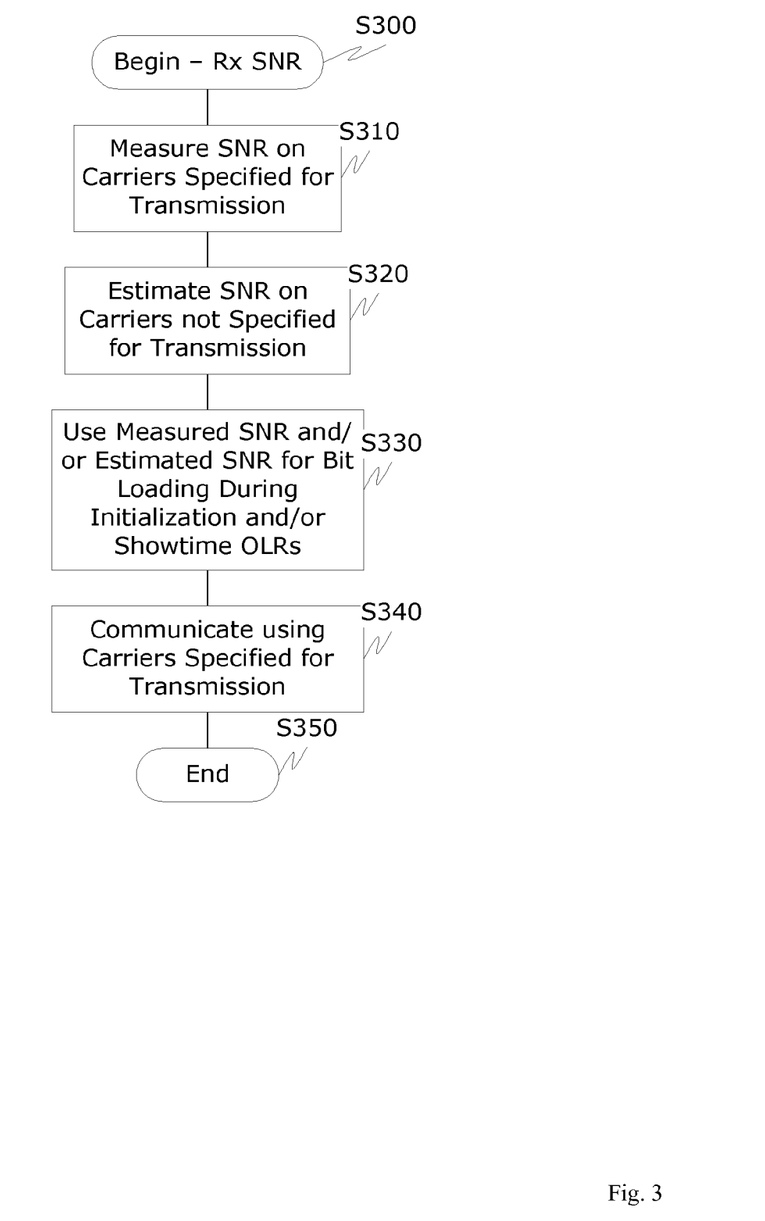
FIG. 3 illustrates an exemplary method for measuring SNR and communicating using specified carriers according to this invention.

FIG. 3 outlines an exemplary method for measuring SNR and entering a low power mode. In particular, control begins in step S300 and continues to step S310. In step S310, the SNR is measured on the carriers specified for use for transmission during the low power mode. Next, in step S320, the SNR on the carriers not specified for transmission is estimated. Then, in step S330, one or more of the measured SNR and estimated SNR are used for bit loading during one or more of initialization and Showtime OLRs. Control then continues to step S340.

In step S340, communication is commenced using the carriers specified for transmission during the LPM. Control then continues to step S350 where the control sequence ends.

Figure 4:
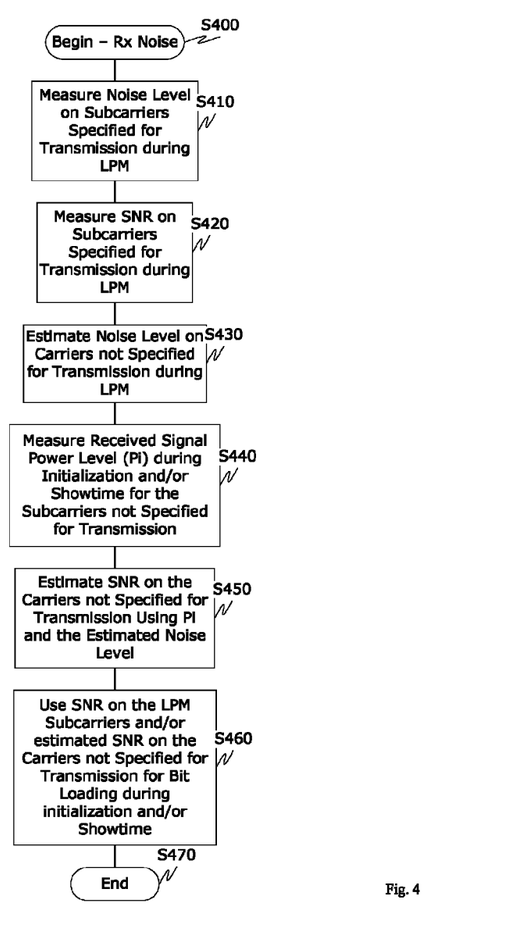
FIG. 4 illustrates an exemplary method for measuring noise and communicating using specified carriers according to this invention.

FIG. 4 outlines an exemplary method of entering a low power mode based on a noise level. Specifically, control begins in step S400 and continues to step S410. In step S410, the noise level on the subcarriers specified for transmission during the LPM is measured. Next, in step S420, the SNR on the carriers specified for transmission during the LPM are measured. Then, in step S430, the noise level on the carriers not specified for transmission during the LPM are estimated. Control then continues to step S440.

In step S440, a received signal power level (Pi) is measured during one or more of initialization and Showtime for the subcarriers not specified for transmission. Control then continues to step S450.

In step S450, the SNR on the carriers not specified for transmission are estimated using Pi and the estimated noise level. Next, in step S460, the SNR on the LPM subcarriers and/or estimated SNR on the carriers not specified for transmission are used for bit loading during one or more of initialization and Showtime. Control then continues to step S470 where the control sequence ends.

Figure 5:
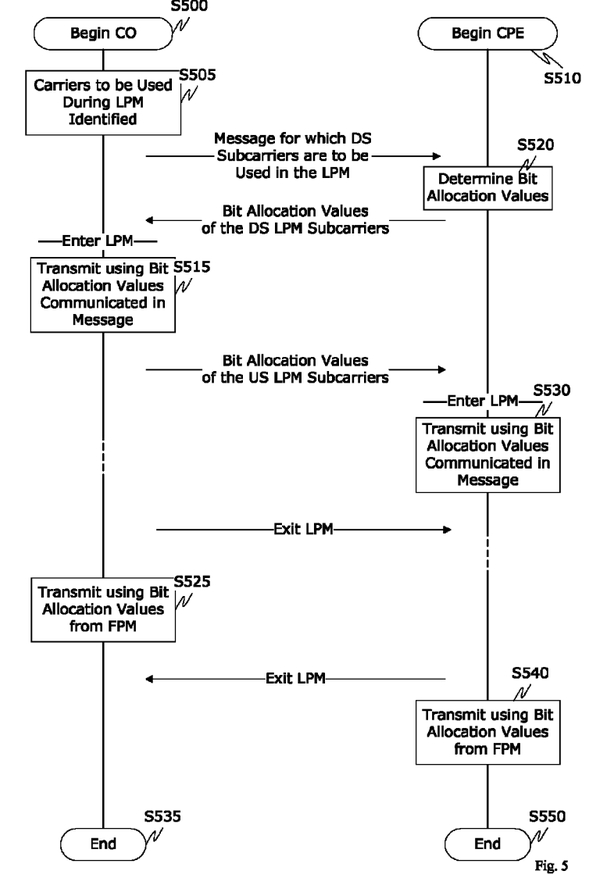
FIG. 5 illustrates an exemplary fencepost diagram outlining communications between modems according to this invention.

FIG. 5 is an exemplary fencepost diagram illustrating the messages exchanged between a CO and a CPE that allow for entry to and exit from the low power mode. Specifically for the CO, control begins in step S500 and for the CPE, in step S510. From the COs perspective, in step S505, the carriers to be used during the low power mode are identified. As discussed, the identification of these carriers can be performed by many different entities and based on one or more differing criteria. Next, a message is sent from the CO to the CPE which specifies which downstream carriers are to be used in the low power mode. Then, the CO receives a message of the bit allocation values of the downstream low power mode subcarriers. The CO then enters the low power mode and in step S515 transmits using the bit allocation values communicated in the message from the CPE.

Should entry of a low power mode for the upstream subcarriers also be desired, the CO sends a message of the bit allocation values of the upstream low power mode subcarriers to the CPE. Transmission in the low power mode continues until an exit low power mode message is sent from the CO to the CPE. At this point, the CO can transition back to transmitting using, for example, the bit allocation values for the full power mode, can reinitialize and determine new bit allocation values, or transmit using some other predefined allocation of bit values. Control then continues to step S535 where the control sequence ends.

From the CPEs perspective, a message for which downstream subcarriers are to be used in the low power mode is received from the CO and in step S520 the bit allocation values determined. A message with the bit allocation values of the downstream low power mode subcarriers is communicated to the CO. If the low power mode is also to be used for the upstream subcarriers, a message is received by the CPE and, in step S530, the CPE enters the low power mode and commences transmitting using the bit allocation values communicated in the message from the CO. For exit from the low power mode, a message is sent from the CPE to the CO and, as with the CO, transition back to transmitting in the FPM can be by using, for example, the bit allocation values for the full power mode prior to entry into the LPM, reinitializing and determining new bit allocation values, or transmitting using some other predefined allocation of bit values. Full power mode communication commences in step S540 with control continuing to step S550 where the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a modem, a multicarrier modem, a DSL modem, an ADSL modem, an xDSL modem, a VDSL modem, a linecard, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with at least any of the following communications protocols: CDSL, ADSL2, ADSL2+, VDSL1, VDSL2, HDSL, DSL Lite, IDSL, RADSL, SDSL, UDSL, or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software, for example, that includes instructions that can executed by a processor, that can be stored on a computer-readable storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided, in accordance with the present invention, systems and methods for conserving power in a communications environment. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A multicarrier communications transceiver having a low power mode, the multicarrier communications transceiver comprising:
a receiver capable of using, in the low power mode, a subset of subcarriers that were transmitted in a full power mode, the subset of subcarriers transmitted in the low power mode having been transmitted at a same power level as when they were transmitted in the full power mode; and
an SNR measurement module capable of measuring a Signal to Noise Ratio of the subset of subcarriers and using the measured Signal to Noise Ratio to estimate one or more of: one or more Signal to Noise Ratios (SNRs) on a second subset of subcarriers and one or more noise levels on the second set of subcarriers.

2. The transceiver of claim 1, wherein the subset of subcarriers is defined as every Nth subcarrier from those that were used in the full power mode and N is a positive integer.

3. The transceiver of claim 1, wherein the subset of subcarriers is defined as L subcarriers every Nth subcarrier from those that were used in the full power mode, where N and L are a positive integers.

4. The transceiver of claim 1, wherein the subset of subcarriers is a list of subcarriers indexes used in the full power mode.

5. The transceiver of claim 1, further comprising a management interface that is operable to configure the subset of subcarriers used in the low power mode.

6. A multicarrier communications transceiver having a low power mode, the transceiver comprising:
a receiver capable of receiving, in the low power mode, a subset of subcarriers that were received in a full power mode, the subset of subcarriers received in the low power mode having been received at a same power level as when they were received in the full power mode and
an SNR measurement module capable of measuring a Signal to Noise Ratio of the subset of subcarriers and using the measured Signal to Noise Ratio to estimate one or more of: one or more Signal to Noise Ratios (SNRs) on a second subset of subcarriers and one or more noise levels on the second set of subcarriers.

7. The transceiver of claim 6, wherein the subset of subcarriers is defined as every Nth subcarrier from those that were used in the full power mode and N is a positive integer.

8. The transceiver of claim 6, wherein the subset of subcarriers is defined as L subcarriers every Nth subcarrier from those that were used in the full power mode, where N and L are a positive integers.

9. The transceiver of claim 6, wherein the subset of subcarriers is a list of subcarriers indexes used in the full power mode.

10. The transceiver of claim 6, further comprising a management interface that is used to configure the subset of subcarriers used in the low power mode.

11. A multicarrier communications system comprising a first transceiver having a low power mode and a second transceiver, the first transceiver comprising a transmitter capable of transmitting, in the low power mode, a subset of subcarriers that were transmitted in a full power mode, the subset of subcarriers transmitted in the low power mode being transmitted at a same power level as when they were transmitted in the full power mode, and the second transceiver comprising a receiver capable of measuring a Signal to Noise Ratio of the subset of subcarriers and using the measured Signal to Noise Ratio to estimate one or more of: one or more Signal to Noise Ratios (SNRs) on a second subset of subcarriers and one or more noise levels on the second set of subcarriers.

12. The system of claim 11, wherein the subset of subcarriers is defined as every Nth subcarrier from those that were used in the full power mode and N is a positive integer.

13. The system of claim 11, wherein the subset of subcarriers is defined as L subcarriers every Nth subcarrier from those that were used in the full power mode, where N and L are a positive integers.

14. The system of claim 11, wherein the subset of subcarriers is a list of subcarriers indexes used in the full power mode.

15. The system of claim 11, further comprising a management interface that is used to configure the subset of subcarriers used in the low power mode.

16. A method, in multicarrier communications transceiver having a low power mode, comprising:
using, by the transceiver, in the low power mode, a subset of subcarriers that were transmitted in a full power mode, the subset of subcarriers transmitted in the low power mode having been transmitted at a same power level as when they were transmitted in the full power mode; and
measuring, in the transceiver, a Signal to Noise Ratio of the subset of subcarriers and using the measured Signal to Noise Ratio to estimate one or more of: one or more Signal to Noise Ratios (SNRs) on a second subset of subcarriers and one or more noise levels on the second set of subcarriers.

17. The transceiver of claim 16, wherein the subset of subcarriers is defined as every Nth subcarrier from those that were used in the full power mode and N is a positive integer.

18. The transceiver of claim 16, wherein the subset of subcarriers is defined as L subcarriers every Nth subcarrier from those that were used in the full power mode, where N and L are a positive integers.

19. The transceiver of claim 16, wherein the subset of subcarriers is a list of subcarriers indexes used in the full power mode.

20. The transceiver of claim 16, further comprising a management interface that is used to configure the subset of subcarriers used in the low power mode.

21. A method, in a multicarrier communications transceiver having a low power mode, comprising:
receiving, by the transceiver, in the low power mode, a subset of subcarriers that were received in a full power mode, the subset of subcarriers received in the low power mode having been received at a same power level as when they were received in the full power mode; and
measuring, in the transceiver, a Signal to Noise Ratio of the subset of subcarriers and using the measured Signal to Noise Ratio to estimate one or more of: one or more Signal to Noise Ratios (SNRs) on a second subset of subcarriers and one or more noise levels on the second set of subcarriers.

22. The transceiver of claim 21, wherein the subset of subcarriers is defined as every Nth subcarrier from those that were used in the full power mode and N is a positive integer.

23. The transceiver of claim 21, wherein the subset of subcarriers is defined as L subcarriers every Nth subcarrier from those that were used in the full power mode, where N and L are a positive integers.

24. The transceiver of claim 21, wherein the subset of subcarriers is a list of subcarriers indexes used in the full power mode.

25. The transceiver of claim 21, further comprising a management interface that is used to configure the subset of subcarriers used in the low power mode.

26. A method comprising:
transmitting, by a transceiver to a second transceiver, in a low power mode, a subset of subcarriers that were transmitted in a full power mode, the subset of subcarriers transmitted in the low power mode being transmitted at a same power level as when they were transmitted in the full power mode, and the transmitted subset of subcarriers being usable by the second transceiver for measuring a Signal to Noise Ratio and using the measured Signal to Noise Ratio to estimate one or more of: one or more Signal to Noise Ratios (SNRs) on a second subset of subcarriers and one or more noise levels on the second set of subcarriers.

27. The transceiver of claim 26, wherein the subset of subcarriers is defined as every Nth subcarrier from those that were used in the full power mode and N is a positive integer.

28. The transceiver of claim 26, wherein the subset of subcarriers is defined as L subcarriers every Nth subcarrier from those that were used in the full power mode, where N and L are a positive integers.

29. The transceiver of claim 26, wherein the subset of subcarriers is a list of subcarriers indexes used in the full power mode.

30. The transceiver of claim 26, further comprising a management interface that is used to configure the subset of subcarriers used in the low power mode.

31. The transceiver of claim 1, wherein the estimating is performed in one or more of the low power mode, during an initialization and in Showtime of the transceiver.

32. The transceiver of claim 6, wherein the estimating is performed in one or more of the low power mode, during an initialization and in Showtime of the transceiver.

33. The transceiver of claim 11, wherein the estimating is performed in one or more of the low power mode, during an initialization and in Showtime of the transceiver.

34. The method of claim 16, wherein the estimating is performed in one or more of the low power mode, during an initialization and in Showtime of the transceiver.

35. The method of claim 21, wherein the estimating is performed in one or more of the low power mode, during an initialization and in Showtime of the transceiver.

36. The method of claim 26, wherein the estimating is performed in one or more of the low power mode, during an initialization and in Showtime of the transceiver.

* * * * *